(No Model.)
J. A. TRAUT.
BOX HANDLE.
No. 395,528. Patented Jan. 1, 1889.
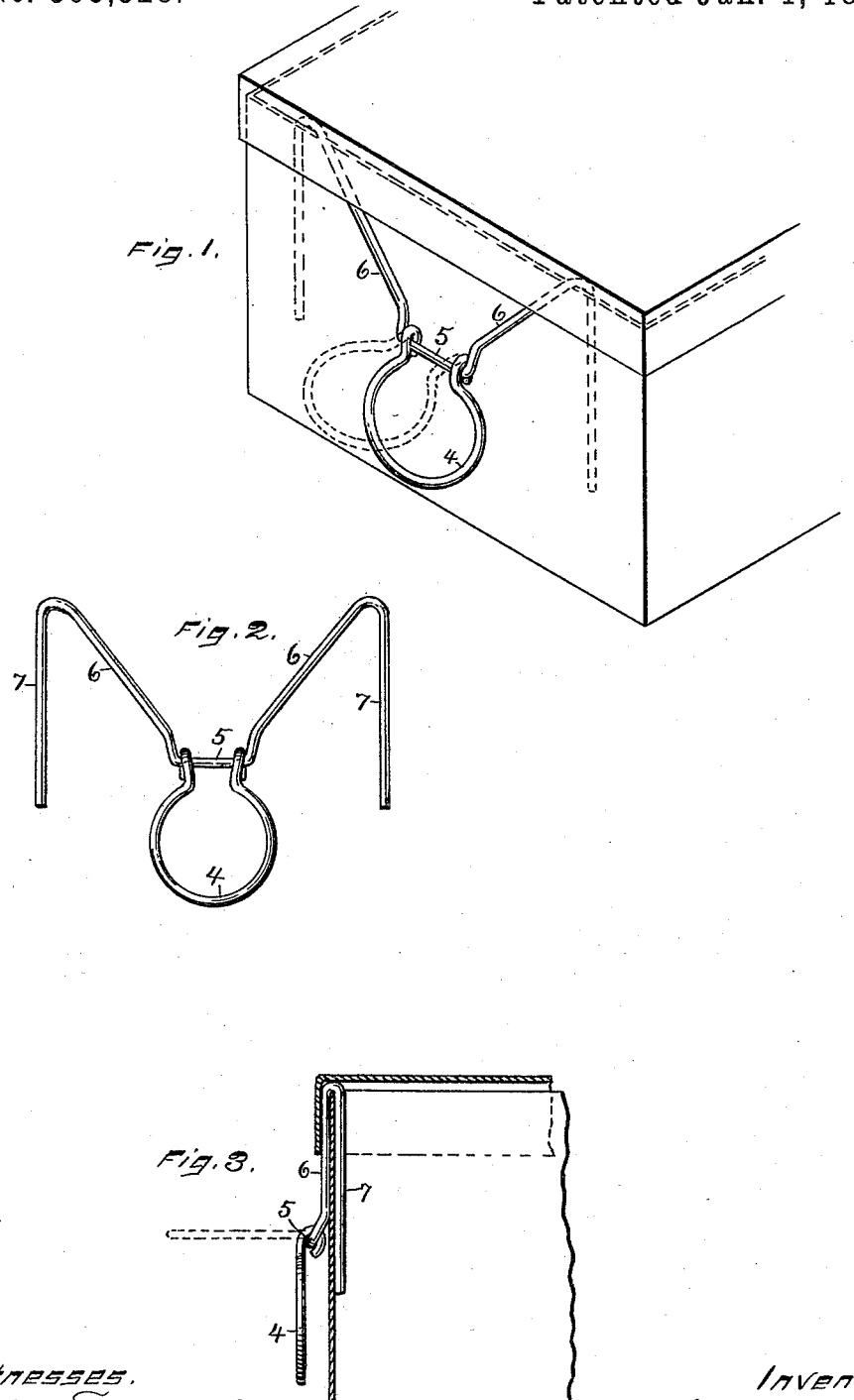

UNITED STATES PATENT OFFICE.

JUSTUS A. TRAUT, OF NEW BRITAIN, CONNECTICUT.

BOX-HANDLE.

SPECIFICATION forming part of Letters Patent No. 395,528, dated January 1, 1889.

Application filed November 27, 1888. Serial No. 291,959. (No model.)

*To all whom it may concern:*

Be it known that I, JUSTUS A. TRAUT, a citizen of the United States, residing at New Britain, in the county of Hartford and State of Connecticut, have invented certain new and useful Improvements in Box-Handles, of which the following is a specification.

My invention relates to improvements in handles for attachment to paper boxes or boxes of thin material; and the object of my improvement is to produce a handle which is neat in appearance and compact in form, so that it will not project to any great extent from the box to which it is applied.

In the accompanying drawings, Figure 1 is a perspective view of one end of a box with my handle applied thereto. Fig. 2 is a front elevation of my handle; and Fig. 3 is a side elevation thereof, together with a section of the end of a box to which the handle is applied.

My invention is in the nature of an improvement upon the box-handle patented to me October 16, 1888, and numbered 391,283. Instead, however, of a rigid handle, I provide the article with a drop-handle, 4, the same being preferably in nearly the form of a ring, with the ends of the metal forming said handle having an eye therein for hinging the handle to the handle-bar 5. As in the aforesaid patent, I employ the diverging arms 6 6, extending outwardly and upwardly from the handle to extend to and over the edge of a box, and the return-arms 7 7, which extend down on the interior of the box. A slight bend is made just above the handle-bar to throw said bar and handle outwardly, as shown most clearly in Fig. 3, so that the handle will not bind against the box, and therefore it will be free to drop into a vertical position, as shown, where it is out of the way and less liable to be hit by those who are passing, making the handle specially adapted for use in cramped places or on boxes that are transported with the handles attached. When it is desired to pull a box from its place, the drop-handle 4 may be elevated into a horizontal position, as shown in Figs. 1 and 3 by the broken lines therein, so as to furnish a good hold upon the handle.

I claim as my invention—

1. The herein-described box-handle, consisting of the handle-bar, the diverging and return arms adapted to clasp the box, and the drop-handle 4, hinged to said handle-bar, substantially as described, and for the purpose specified.

2. The herein-described box-handle, consisting of the handle-bar 5, diverging and return arms 6 and 7, for clasping the box, and the drop-handle, the diverging arms 6 6 being bent outwardly just above the handle-bar, substantially as described, and for the purpose specified.

JUSTUS A. TRAUT.

Witnesses:
  H. C. HINE,
  ARTHUR GRUMBT.